(12) United States Patent
Apte et al.

(10) Patent No.: US 6,467,040 B1
(45) Date of Patent: Oct. 15, 2002

(54) CLIENT AUTHENTICATION BY SERVER NOT KNOWN AT REQUEST TIME

(75) Inventors: Ajay A. Apte, Austin, TX (US);
Sreedhar Arda, Austin, TX (US);
William Mitchell Edwards, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,092

(22) Filed: Dec. 11, 1998

(51) Int. Cl.[7] ............................................... H04L 9/00
(52) U.S. Cl. ....................................... 713/168; 713/200
(58) Field of Search ................................ 713/168, 169, 713/200; 709/201, 202, 217, 219

(56) References Cited

U.S. PATENT DOCUMENTS

| | | | |
|---|---|---|---|
| 5,485,519 A | 1/1996 | Weiss | 380/23 |
| 5,491,752 A | 2/1996 | Kaufman et al. | 380/30 |

OTHER PUBLICATIONS

US 5,373,559, 12/1994, Kaufman et al. (withdrawn)

Primary Examiner—Matthew B. Smithers (74) Attorney, Agent, or Firm—David A. Mims, Jr.; Bracewell & Patterson, L.L.P.

(57) ABSTRACT

A method for providing network security is disclosed wherein a network is comprised of at least one client and at least one server. The server identity may be unknown at the time of a client request. The method begins when a client transmits an information processing request and a negotiator object reference to a server. The server receives the information processing request and the negotiator object reference. If the server can process the request it becomes the accepting server. If the server cannot process the request, the server retransmits the request. This process continues until an accepting server is located. Next, the accepting server initiates a server request for the client to process an authentication object in response to the received negotiator object reference. The accepting server determines whether the client has the authentication object and if the client does not have the authentication object the accepting server sends the authentication object to the client. Then the client processes a method on the authentication object. The accepting server verifies client authentication in response to the authentication object processed by the accepting server. Next, the accepting server services the information processing request if the client is verified such that a server which is unknown to a client at the time of a client request can verify a requesting clients authenticity.

21 Claims, 5 Drawing Sheets

Fig. 2B
(AMENDED)

CLIENT AUTHENTICATION BY SERVER NOT KNOWN AT REQUEST TIME

BACKGROUND OF THE INVENTION

1. Technical Field

The present invention relates in general to computer network security, and in particular to a method and system for a network server to authenticate a requesting client. Still more particularly, the present invention relates to a method and system for a server to authenticate a client when a server is unknown at the time a client initiates a request to a server.

2. Description of the Related Art

A client-server network or system typically allows for the sharing among locations or facilities, information processing functions by a collection of computers and other devices linked together by a communications facility such as a network. Quite often, such distributed computing requires a highly structured environment which allows hardware and software to communicate, share resources, and freely exchange information.

Many large computing systems include resources such as one or more central processing units, main memories, disk and/or tape storage units, and printers. Such a system may also include user terminals or client terminals, such as workstations. In many implementations, each user or client terminal may have its own local resources, such as one or more central processing units, associated main memory, a printer, and disk or tape storage.

Alternately, a client or user terminal may request such resources from one or more servers or other workstations via a communications facility. In the present application, it is understood that a workstation includes other user terminals that are not necessarily sold as workstations, such as personal computers.

Different approaches have been utilized to maintain the security of system resources from unauthorized access. One such approach is the utilization of security tokens or authentication tickets carried from the client to a server. Such a security token or authentication ticket is typically utilized to prove the identity of the client to the server and further establish a way of securing subsequent communications between the two entities. Hence, a security token establishes a secure association between the client and the server.

Due to the cost of computing a security token, a security token is only communicated to the server on the first request. This occurs because a computation that takes place over a client server network must secure a security token from a security server. Processing a security token is a complex computation.

Subsequent to initial processing of security protocol, the client and the server need to find a reliable way to securely communicate with each other under the established security association. Typically, an initial security token is transmitted upon the first request, and each subsequent request by the client to the server does not require an arduous ritual. major problem of security protocol which must be provided is that some requests are forwarded by a first server, which initially accepts the client's request to a second server which is capable of processing the request.

The server that actually services the client's request often cannot be identified by the client at the time the client's request is issued. Frequently, different servers require different protocols to authenticate clients. Therefore, the protocol structure and/or the type of authentication data required to allow client access to an unknown server is unascertainable upon the transmission of a client's request.

Alternately described, a client has no way to know what authentication data must be sent to a server and what form to put the data in because the server which will process the request is unknown at the time the request is transmitted by the client.

It would therefore be desirable to provide a client-server security system which allows a client to be authenticated by a server which is unknown at the time of a client's request.

SUMMARY OF THE INVENTION

It is therefore one object of the present invention to provide computer network security.

It is another object of the present invention to provide a method and system for a network server to authenticate a client.

It is yet another object of the present invention to provide a method and system for a server to authenticate a client when a server is unknown to the client at the time the client initiates a request for access to the server.

The foregoing objects are achieved as is now described. A method for providing network security is disclosed wherein a network is comprised of at least one client and at least one server. The server identity may be unknown at the time of a client's request. The method begins when a client transmits an information processing request and a negotiator object reference to a server. The server receives the information processing request and the negotiator object reference. If the server can process the request it becomes the accepting server. If the server cannot process the request the server retransmits the request. This process continues until an accepting server is located. Next, the accepting server initiates a server request for the client to process an authentication object in response to the received negotiator object reference. The accepting server determines whether the client has the authentication object and if the client does not have the authentication object the accepting server sends the authentication object to the client. Then the client processes a method on the authentication object. The accepting server verifies client authentication in response to the authentication object processed by the accepting server. Next, the accepting server services the information processing request if the client is verified such that a server which is unknown to a client at the time of a client request can verify a requesting clients authenticity.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1A:
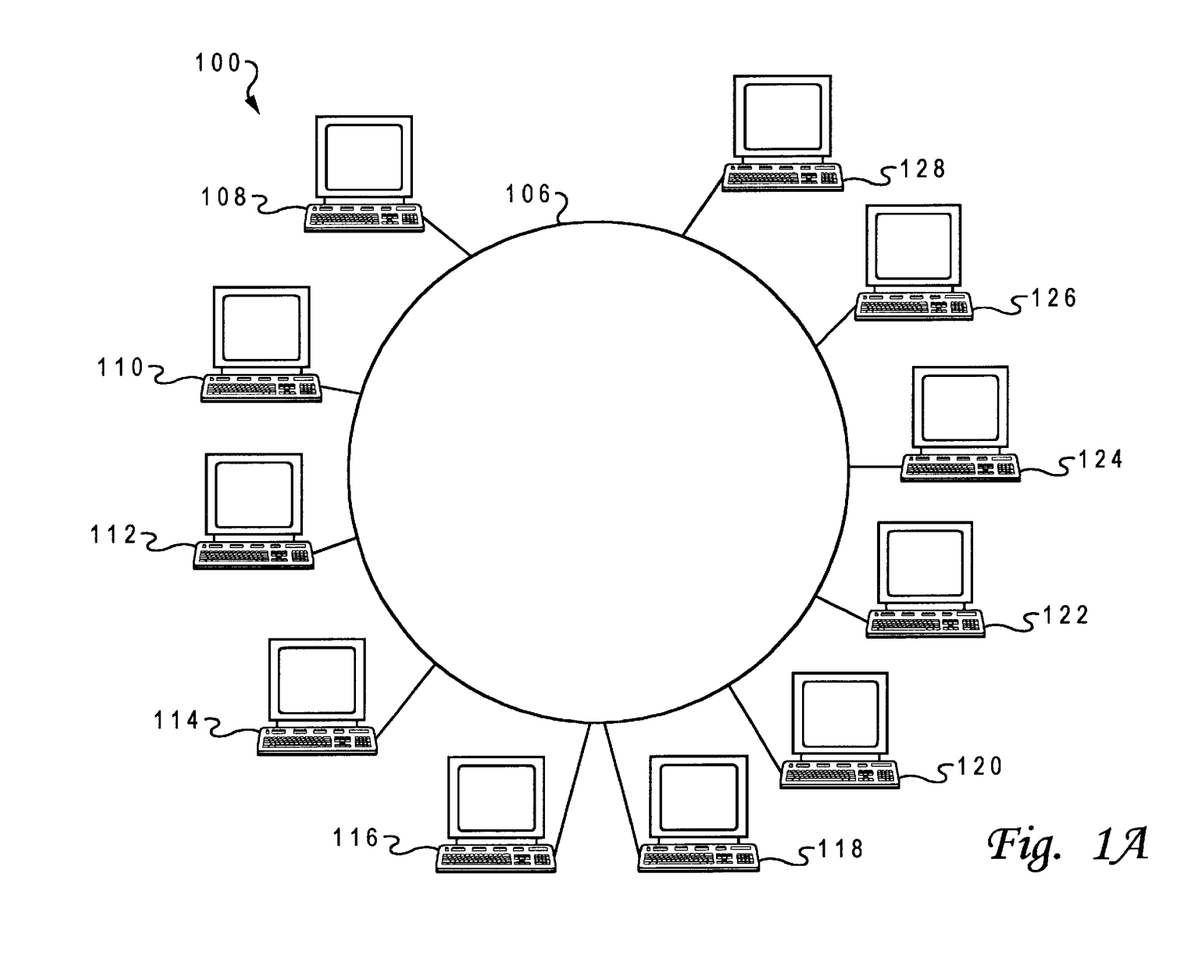
FIG. 1A illustrates a typical client-server network for which the present invention is designed.

With reference now to the figures and in particular with reference to FIG. 1A, there is depicted a distributed computing system 100 having information handling systems 108, 110, 112, 114, 116, 118, 120, 122, 124, 126, and 128 connected thereto in a conventional manner. Each of the information handling systems may be referred to as workstations, clients, or servers. Network 106 may be a local area network, a wide area network, or a nationwide or international data transmission network, or the like, such as the Internet.

Figure 1B:
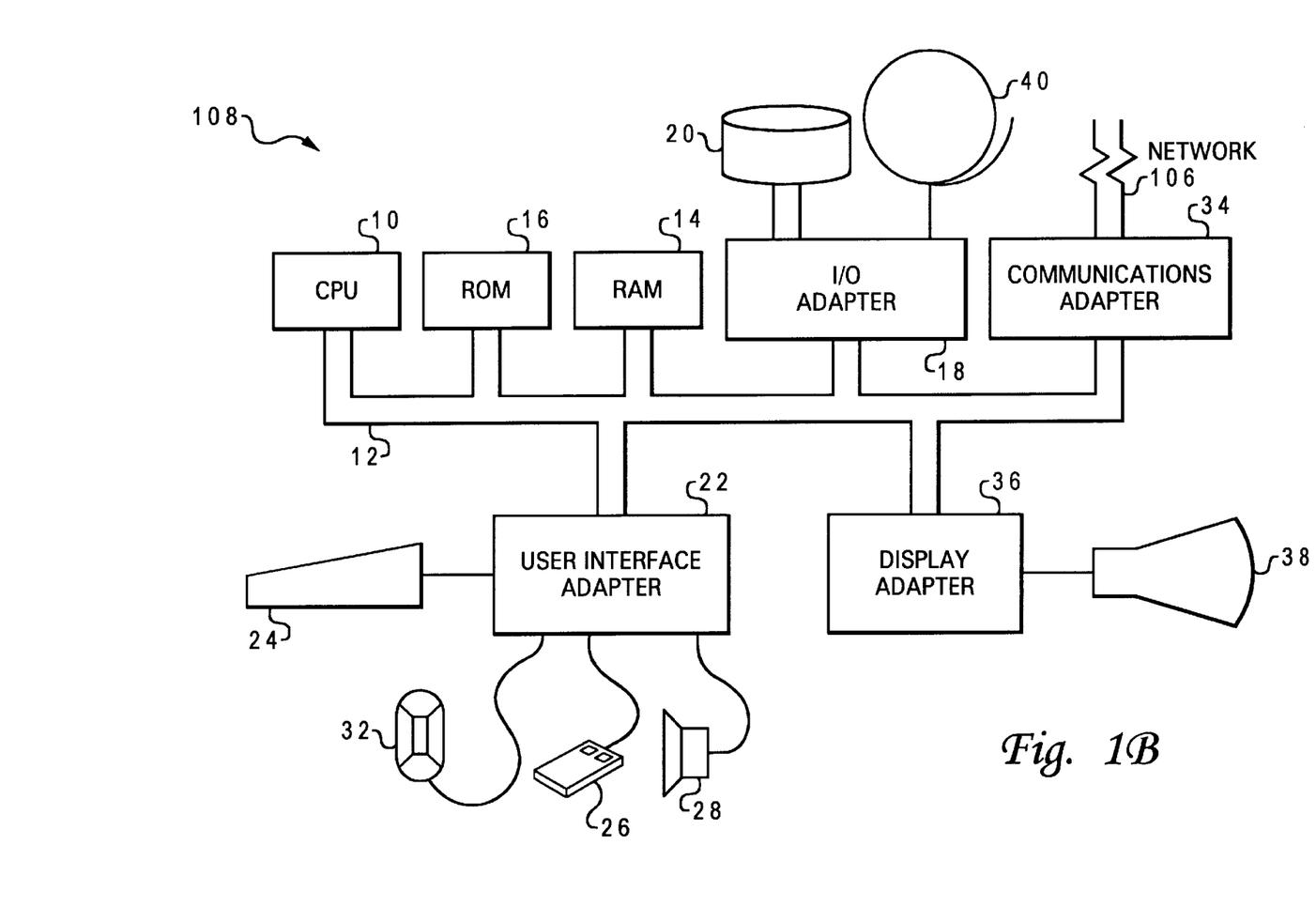
FIG. 1B depicts a data processing system or an information handling system for implementing the present invention.

Referring next to FIG. 1B, there is illustrated a representative hardware environment which illustrates a typical hardware configuration of an information handling system 108 (see FIG. 1A) in accordance with the subject invention, having a central processing unit 10, such as a conventional microprocessor, and a number of other units interconnected via system bus 12.

Information handling system 108 as illustrated in FIG. 1B includes random access memory (RAM) 14, read-only memory (ROM) 16, I/O adapter 18 for connecting peripheral devices such as disk units 20 and tape drives 40 to system bus 12, user interface adapter 22 for connecting keyboard 24, mouse 26, speaker 28, microphone 32, and/or other user interface devices such as a test screen device (not shown) to system bus 12, communications adapter 34 for connecting information handling system 108 to network 106, and display adapter 36 for connecting system bus 12 to display device 38.

In the following description, for purposes of specific program procedures, application program interfaces, and configurations are set forth to provide a thorough understanding of the present invention. The preferred embodiment described herein is implemented by object oriented programming.

While it would be apparent to one skilled in the art that the present invention may be practiced without the specific details and be implemented in various computer systems utilizing various operating systems and in various configurations or makes or models of coupled processors or in various configurations of loosely coupled multi-processor systems. The procedural descriptions and representations which follow are the means utilized by those skilled in the art to convey the substance of their work to others having skill in the art.

The present invention provides a method and system for maintaining a secure association between clients and servers forming a distributed computing system controlled by, for example, object oriented programming.

Referring now to FIGS. 2A, 2B, 2C, and 2D interrelated high level flow diagrams of the present invention are illustrated. The series of high level flow diagrams are interconnected with path callouts utilizing alphabetical designation. Referring briefly to FIG. 1A, the method of the present invention is executed by different processors or machines via a communication link. Specifically, a client machine or a qualified server which can provide information handling or data processing.

Figure 2A:
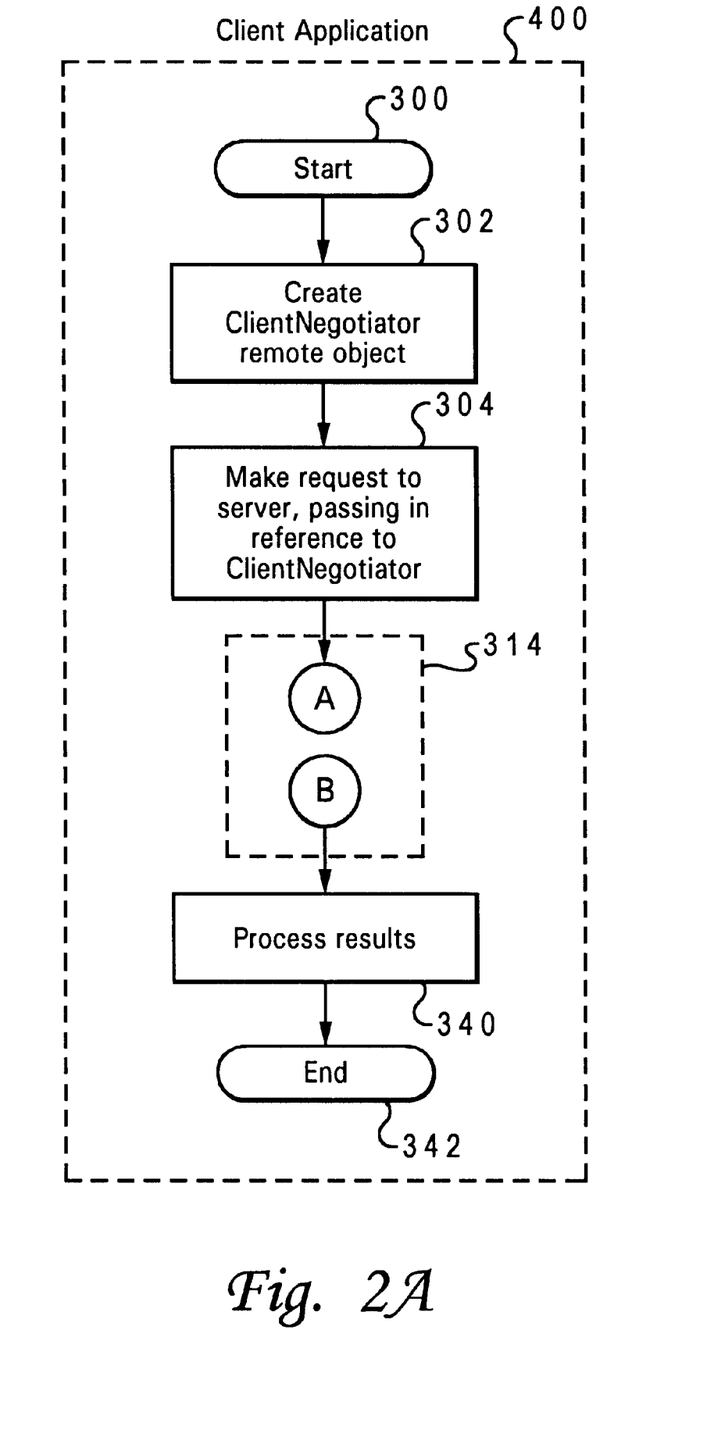
FIG. 2A depicts a high level flow diagram illustrating one embodiment of a client application in accordance with the present invention.
Figure 2B:
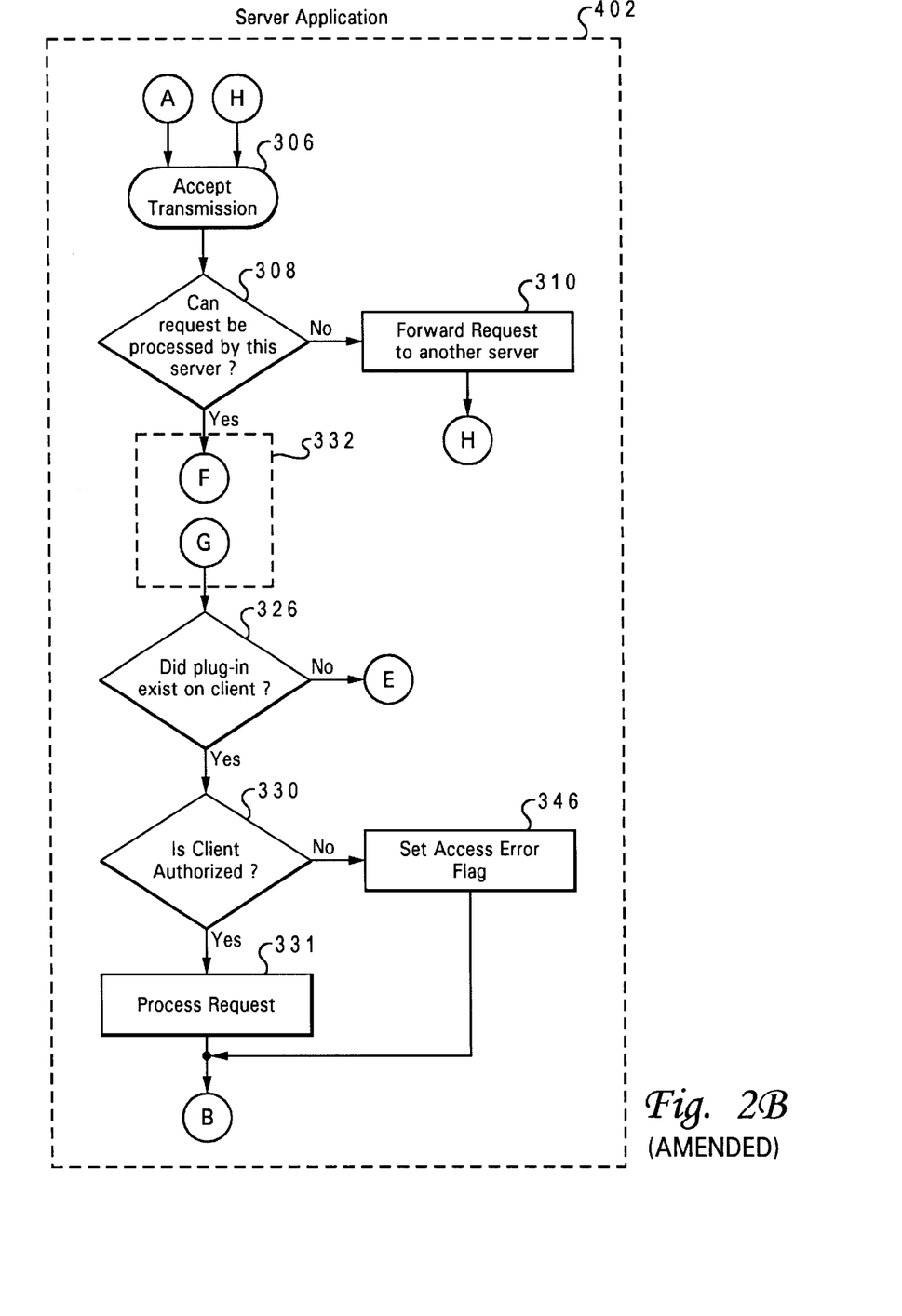
FIG. 2B depicts a high level flow diagram illustrating one embodiment of a Server application in accordance with the present invention.
Figure 2C:
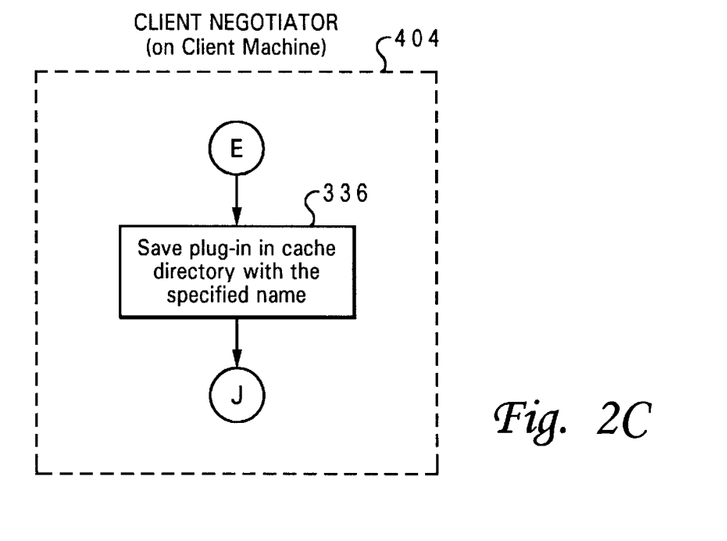
FIG. 2C depicts a high level flow diagram illustrating one embodiment of a client negotiator in accordance with the present invention.
Figure 2D:
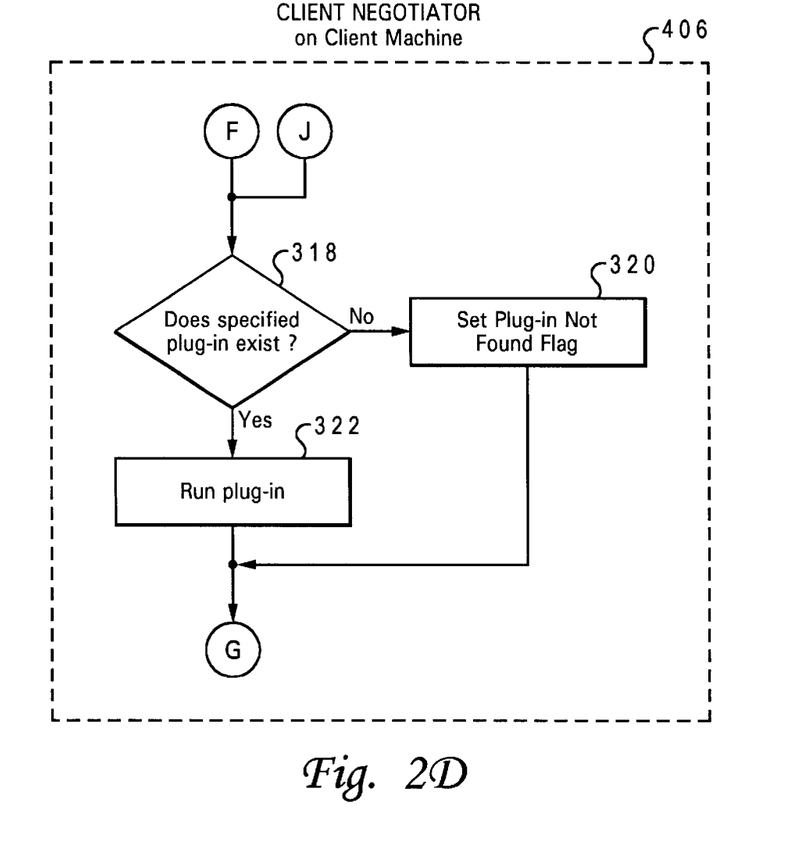
FIG. 2D illustrates a high level flow diagram illustrating one embodiment of a client negotiator in accordance with the present invention.

Referring back to the high level flow diagram of FIG. 2A, first dashed enclosure 400 represents an object entitled "ClientApplication". ClientApplication is processed on a client machine or processor and ClientApplication makes a request to a server machine. Since a server machine may forward a request to another server machine, the ClientApplication does not necessarily know which server machine will ultimately service the request at the time the client request is made. Second dashed enclosure 402 in FIG. 2B represents an object referred to as "ServerApplication." Third dashed enclosure 404 in FIG. 2C and fourth dashed enclosure 406 in FIG. 2D represents the object referred to as "ClientNegotiator". ClientNegotiator is also processed on the client machine requesting service by a server machine.

Objects can be passed between data processing systems. Passing an object between data processing systems is implemented by passing a copy of the object. Typically, passing a remote object implies that only a reference to the object is passed between data processing systems. Methods are operations that can be performed on objects. Therefore, to perform an operation on an object a method is invoked on the object.

Each dashed enclosure contains a method on an object. Each flow diagram within a dashed enclosure corresponds to a method for the object. ClientNegotiator is a remote object which is processed on a client machine.

ClientNegotiator's main objective is to obtain user (i.e. client) authentication data. ClientNegotiator actually obtains authorization data by invoking a method on a "plug-in" object supplied by the server machine. The plug-in object implements a prescribed interface such that the ClientNegotiator can interact with the plug-in in a predetermined way.

The plug-in may obtain the authentication data by, for example, displaying a pop-up dialog with prompts a user for an ID and a password. A server machine can then utilize the authentication data to determine whether a client is authorized to initiate server utilization. The type of authentication data required can be specific to each server machine.

Since ClientApplication does not necessarily know which server machine will ultimately process the client request, the ClientApplication can not know what authentication data is required at the time the request is made. The process of invoking methods on the plug-in routine is driven by the server machine processing the request via the ClientNegotiator.

The ServerApplication object functions to return data to the client machine. ServerApplication is typically executed on a machine remotely located from the client machine. ServerApplication can make calls or requests to the ClientNegotiator object for additional data. Additional data might include a password or any other form of user identification.

Additionally, a ServerApplication can also forward a processing request to another ServerApplication running on an another server machine. It follows that prior to a client request the server which will process the request is undetermined. The ServerApplication which is actually serving the client's request is the ServerApplication which initiates calls to the ClientNegotiator.

In FIG. 2A the method begins at block 300 and thereafter proceeds to block 302. For a given network deployment, a client creates a remote object as illustrated in block 302. A remote object is data on which an operation can be performed or a process which can be implemented by an information handling or data processing system. The remote object is accessible from other machines.

As illustrated in block 304 the client makes a request to a server by transmitting the request over a communication media. Fourth dashed enclosure 314 breaks down into a synchronous call to another object. In this case a synchronous call to ServerApplication. Fourth in dashed enclosure 314 illustrates an exit path A and a return path B.

In a preferred embodiment, the ClientApplication program halts processing the ClientApplication program after sending the request as the method proceeds via path A to FIG. 2B. When communication with the ClientApplication is re-initiated via path B the ClientApplication commences where the program halted and proceeds therefrom.

Referring now to FIG. 2B following path A to block 306, a server accepts the client transmission as illustrated in block 306. Appended to each client's request is a reference to the remote ClientNegotiator object. The client request will typically be a request to a server machine for information, or a request for information handling.

The server which initially receives the client transmission might be unable to process the client request because the server does not have the required information or hardware. In this case the server which initially receives the client transmission and retransmits the client request to other servers. A server which can process the client request and does so is referred to as an accepting server. The process for a server accepting or retransmitting a client request is well known by those having skill in the art.

As illustrated in block 308 if the server determines it can process the client request then the method proceeds to fourth dashed enclosure 332. If the server which receives the client transmission cannot process the client request, the client request is forwarded to a peer server in an attempt to locate a server which can process the client request, as illustrated in block 310. An accepting server is implemented as a ServerApplication object. Peers to a given server object are instances of other server objects that reside on other server machines.

When a request accepting server cannot be located, a given ServerApplication object can forward a request to its peers. Its peers can, in turn, forward the request to their peers. This process continues until a server is located which is capable of processing the client request (i.e. an accepting server is located).

In a preferred embodiment the communication path traveled by the client request is identified. When a client request travels from server to server the path is record ed so that return communication can also utilize the recorded path. When a server which can process the request returns data, the returning data follows the recorded communication path in the opposite direction of which the client request traveled.

In alternate embodiments the server could bypass the identified path and communicate directly with the server. Additionally specific servers identified in the client request path could be bypassed to speed the return communication.

The ClientNegotiator object reference is transmitted simultaneously by the client with the information processing request. Hence, all servers that receive the information processing request receive the ClientNegotiator object. Because servers are capable of relaying information, a server may receive a request from a client either directly, or by another server machine which has forwarded the request. Thus, referring back to block 310 path H restarts ServerApplication on a different server than the server which path A started the ServerApplication. Additionally, each time path H is utilized, a different server commences processing of ServerApplication.

Thus, a caller can be the ClientApplication or the ServerApplication object which forwarded a request. Referring back to block 306 the transmission is accepted by a server. Then, as illustrated in block 308, if the client request can be processed by the server accepting the transmission (i.e. an accepting server is located), the server invokes a method on a client "plug-in" object, depicted in fifth dashed enclosure 332. Thus, if the server can process the request, the server sends a server request to the requesting client machine requesting the client to run the client plug-in method.

Fifth dashed enclosure 332 illustrates the method proceeding via path F to FIG. 2D. In a preferred embodiment processing on the ServerApplication program halts after sending of the server request via path F to FIG. 2D. It is preferred that when communication with the ServerApplication is re-initiated via path G from FIG. 2D the ServerApplication commences where the program halted and proceeds therefrom.

Referring now to FIG. 2D and as illustrated in block 318, the ClientNegotiator object determines if the plug-in method specified by the ServerApplication is accessible by the client machine. If the plug-in method is not accessible by the client machine, the method proceeds to block 320 and a "plug in not found" flag is set. Then, the method returns to fifth dashed enclosure 332 in FIG. 2B via path G.

However, as illustrated in block 318, if the specified "plug-in" exists and can be located by the client machine, the ClientNegotiator object runs the "plug-in" method, as illustrated in block 322.

The plug-in method can be referred to as an Authentication object. The Authentication object does not perform authentication. The Authentication object collects the necessary data required to authenticate a client. Whereas the server actually processing the request performs the authentication. The method then returns to FIG. 2B and fifth dashed enclosure 332 as illustrated by path G.

Next, as illustrated in block 326 the ServerApplication determines if the plug-in method was found by the client. If the ClientNegotiator returns a "plug-in not found" indication, then as illustrated by path E leading to block 336 in FIG. 2C, the server requests the client to save the plug-in as part of the ClientNegotiator object.

As illustrated in block 336 the plug-in is saved, preferably in a cache directory, such that the plug-in can be quickly located by the ClientNegotiator object when required. Next, moving to block 318 in FIG. 2D, as illustrated by path J it is determined if the client plug-in exists in the client machine.

Because the plug-in was saved by the client in the description of FIG. 2C, then, as illustrated in block 318 the plug-in will exist and the method proceeds to block 322 where the plug-in method is run. Thereafter the method proceeds to FIG. 2B via path G. Because the plug-in was save as illustrated in block 336 of FIG. 2C, then, as depicted in block 326 the plug-in does exist and the method proceeds to block 330.

As illustrated in block 330, the ServerApplication checks the authorization of the client. If it is determined that the client is authorized as illustrated in block 330, the ServerApplication services the request as illustrated in block 331. Next, the server returns the results of the authorization check as illustrated by path B to fourth dashed enclosure 314 in FIG. 2A.

Next, the ClientApplication processes the results of the ServerApplication reply as illustrated in block 340. The process thereafter ends at block 342.

However if the client is not authorized, as illustrated in block 330, the client is given a "denied access" indication as illustrated in block 346 and the process moves to fourth dashed enclosure 314 in FIG. 2A via path B. The results are processed as illustrated in block 340 and thereafter the process ends at block 342.

The main focus of the ClientNegotiator object is to execute plug-in methods for an accepting server. A plug-in method can be executed on the client machine to obtain authentication data necessary for the server machine to verify client authenticity. The plug-in methods may consist of displaying a dialog window initiated by the server on the client machine. The dialog window might request a user ID and a password, a well known combination of authorization verification in the art.

The resulting byte-stream is sent from the client to the server. The plug-in method can encrypt the authentication data transmission as necessary to prevent eavesdropping.

It is also important that the servers plug-in capability initially does not reside on the client. However, the server can send the plug-in capability to the client via the Client-Negotiator object method call. The ClientNegotiator can then be directed by the server to invoke the plug-in routine to obtain the authentication data.

The server that actually services the request can call methods on the ClientNegotiator object to obtain the necessary authentication data. Since the ClientNegotiator object is a remote object, the method calls are processed on the information processor (i.e. client) on which the object was created, in this case, the client machine.

The utilization of public and private keys would work well with the present invention. The data returned by server objects could be encrypted so that only clients with the correct key can decrypt it. Also, the same data can also be encrypted with the server's private key as a way of ensuring the clients that the data is authentic.

With the approach described above, the client does not have to know what server is being accessed or what authentication data is required when the client request is issued.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 14 of one or more computer systems configured generally as described in FIG. 1B.

Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. The set of instruction can be referred to as a computer program product. Further, the set of instructions can be stored in the memory of another computer and transmitted over a local area network or a wide area network, such as the Internet, when desired by the user.

One skilled in the art would appreciate that the physical storage of the sets of instructions physically changes the medium upon which it is stored electrically, magnetically, or chemically so that the medium carries computer readable information. The invention is limited only by the following claims and their equivalents.

The present invention applies to various types of networks including Local Area Networks (LAN)s, the Internet and other computing systems having data processing systems which are located in separate areas.

Only one client and one server are necessary to implement the present invention. For example, one transmitting client and one accepting server could utilize the method of the present invention. However, the present invention is more likely to be utilized by a plurality of servers and a plurality of clients.

While the invention has been particularly shown and described with reference to a preferred embodiment, it will be understood by those skilled in the art that various changes in form and detail may be made therein without departing from the spirit and scope of the invention.

What is claimed is:

1. A method for providing network security, wherein a network is comprised of at least one client and at least one server wherein the server may not be known by the client prior to a client request, said method comprising the steps of:

transmitting an information processing request and a negotiator object reference from a client to an accepting server;

initiating a server request from said accepting server to said client for said client to process an authentication object in response to said negotiator object;

processing a method on an authentication object by said negotiator object residing on said client;

verifying client authentication in response to said processed authentication object's method; and servicing said information processing request by said accepting server when said client is verified such that a sever which is unknown to a client at the time of a client request can verify a clients authenticity.

2. The method of claim 1, further comprising the step of determining whether said client has access to said authentication object.

3. The method of claim 2, further comprising the step of sending said authentication object to said client if said client is determined not to have said access to said authentication object.

4. The method of claim 3, further comprising the step of storing the authentication object at a location which is accessible to said client.

5. The method of claim 4, further comprising the step of transmitting a directory and a path name where said authentication object is stored.

6. The method of claim 1, further comprising the step of finding an accepting server by re-transmitting said request from server to server wherein said accepting server is unknown before said step of transmitting.

7. The method of claim 1, further comprising the step of receiving a processed information processing request by said client.

8. The method of claim 1, further comprising the step of forwarding said information processing request and said negotiator object reference by a first server to said accepting server.

9. The method of claim 1, further comprising the step of forwarding said information request and said negotiator object reference to a peer server.

10. The method of claim 1, further comprising the step of receiving said information processing request and said negotiator object reference at an accept server.

11. The method of claim 1, further comprising the step of forwarding said information processing request to a second server if a server which is initially sent said information processing request is unable to process said information processing request.

12. A computer program product stored in signal bearing media providing a network security method, said computer program product comprising:

instruction means stored in signal bearing media for transmitting an information processing request and a negotiator object reference from a client to an accepting server;

instruction means stored in signal bearing media for initiating a server request from said accepting server for said client to process an authentication object in response to said negotiator object reference;

instruction means stored in signal bearing media for processing said negotiator object residing on said client;

instruction means stored in signal bearing media for verifying client authentication in response to said processed authentication object; and     instruction means stored in signal bearing media for servicing said information processing request by an accepting server if said client is verified, wherein a server which is unknown to a client at the time of a client request can verify a clients authenticity.

13. The computer program product of claim 12, further comprising instruction means for deter whether said client has said authentication object.

14. The computer program product of claim 12, further comprising instruction means for sending said authentication object to said client if said client is determined not to have said authentication object.

15. The computer program product of claim 12, further comprising instruction means for storing the authentication object on a client machine.

16. The computer program product of claim 12, further comprising instruction means for transmitting the directory and the path name where said authentication object is stored on said client machine.

17. The computer program product of claim 12, further comprising instruction means for receiving a processed information request by said client.

18. The computer program product of claim 12, further comprising instruction means for forwarding said information processing request and said negotiator object reference from server to server.

19. The computer program product of claim 12, further comprising instruction means for forwarding said information request and said negotiator object reference to a peer server.

20. The computer program product of claim 12, further comprising instruction means for finding an accepting server by re-transmitting said request from server to server wherein said accepting server is unknown before said step of transmitting.

21. A computer system which provides network security, comprising:

at least one client;

at least one server wherein the server may not be known by the client prior to a client request;

a communications media coupling said at least one client to said at least one server;

means for transmitting an information processing request and a negotiator object reference from a client to an accepting server;

means for initiating a server request from said accepting server to said client for said client to process an authentication object in response to said negotiator object;

means for processing a method on an authentication object by said negotiator object residing on said client;

means for verifying client authentication in response to said processed authentication object's method; and     means for servicing said information processing request by said accepting server when said client is verified such that a server which is unknown to a client at the time of a client request can verify a clients authenticity.

\* \* \* \* \*